United States Patent Office.

TRUMAN J. PEARCE AND MELVIN W. BEARDSLEY, OF OAKLAND, ASSIGNORS TO THE PARAFFINE PAINT COMPANY, OF SAN FRANCISCO, CALIFORNIA.

MIXED PAINT.

SPECIFICATION forming part of Letters Patent No. 338,868, dated March 30, 1886.

Application filed September 17, 1884. Serial No. 143,300. (Specimens.) Patented in Victoria November 26, 1884; in New Zealand December 11, 1884, and in New South Wales January 20, 1885, No. 1,566.

*To all whom it may concern:*

Be it known that we, TRUMAN J. PEARCE and MELVIN W. BEARDSLEY, citizens of the United States, residing in the city of Oakland, county of Alameda, and State of California, have invented a new and useful Composition of Matter; and we do hereby declare that the following is a full, clear, and exact description thereof, sufficient to enable any person skilled in the arts to which our invention most nearly pertains to manufacture and use our new composition.

Our invention relates to the utilization of the solid residuum that comes from the heavier petroleums in the production and manufacture of water-proof and weather-proof compositions for application and use in a cold state or without the agency of heat.

We have discovered that by uniting the solid residuum product obtained in the distillation of heavy petroleums and a fluid solvent of suitable character to reduce this solid and hold it in solution a mixture or composition is produced which has excellent qualities and properties. It will form a thoroughly water-proof and weather-proof paint or composition for coating surfaces of wood and metal. It will preserve submerged surfaces of all kinds of marine structures from the action of sea-water. It will protect leather and fibrous and textile substances, and it will be found to possess the peculiar and very valuable property of resisting the action of acids and alkalies, and such powerful agents as lime, ammonia, and glycerine.

Our invention, based on this discovery, consists in the production and manufacture of a paint or composition for use at ordinary temperature from the solid residuum product which is obtained from the heavier petroleums substantially after the manner hereinafter described.

In distilling the heavy grades of petroleum there is obtained a solid residium which we call "maltha." Taking this substance for the base of our composition, we dissolve and reduce it to the required degree of consistence by means of a fluid solvent, which will thoroughly dissolve the maltha and hold it in complete solution. That solvent is best suited to the purpose which will not only dissolve this matter, but will secure uniform density of the composition in the various grades or degrees of consistence that may be found best adapted for the different applications and uses of the composition. These essentials are found in bisulphide of carbon, and it is recommended by us as the best and most suitable solvent for the purpose. Bisulphide of carbon has also great penetrating power, and after evaporation, when the composition is spread on or otherwise applied to a surface, it leaves a solid dry firm coat or covering which is elastic and pliable, and which will protect the surface or substance it is applied to both against the elements and against acids and alkalies.

By dissolving and mixing fifty (50) parts, by weight, of the maltha with fifty (50) parts of this solvent we produce a composition suitable for coating wood and metal where a thin coat and a considerable degree of penetration are desired. This mixture will be quite limpid, and will therefore saturate and penetrate surfaces and substances more quickly than a thicker mixture.

The proportions of sixty (60) parts of the maltha to forty (40) parts of the solvent will be found more suitable where the composition is intended for saturating wood; but for many purposes it is best produced by using the proportions of sixty-six (66) parts of maltha and thirty-four (34) parts of the solvent. The composition from such proportions is suitable for covering surfaces of metal and of wood, for painting ships' bottoms and submarine structures, and for general use. It will also answer well for waterproofing either by painting or saturating, and is a good form of the composition for most of the uses to which it will be generally applied. By using a larger proportion of the maltha the composition can be made of considerable thickness, and so nearly solid that it will require to be applied with a trowel or a similar instrument. In such condition it is tenacious and will not saturate unless very slightly.

The qualities and properties of hardness, tenacity, pliability, and elasticity peculiar to and inherent in the maltha may be varied and different degrees of any one or more thereof secured in the composition by adding to it a proportion of some suitable substance or substances possessing the desired quality or property—as, for instance, asphalt added to the composition will increase the body, but will make it less tenacious and more brittle. Rosin will add hardness to it. Sulphur will give hardness, but will also make the composition more brittle when it becomes dry. Paraffine will make it more elastic and pliable. Therefore to give the composition special characteristics for special purposes a proportion of any one or more of these substances may be added to it; also, such other substances—as white lead, red lead, coloring-matter, and pigments as are commonly used in mixed paints may be added to the composition with results analogous to the usual results produced by using the same substances in mixed paints.

From the foregoing description and illustrations a person skilled in the preparation and manufacture of paints and compositions of the kind to which our invention appertains will understand how to produce and make the composition in any desired form or grade of consistence from the aforesaid product.

Having thus fully described our invention, what we claim, and desire to secure by Letters Patent, is—

As a new composition of matter, maltha and bisulphide of carbon, substantially as herein set forth.

TRUMAN J. PEARCE.
MELVIN W. BEARDSLEY.

Witnesses as to signature of T. J. Pearce:
EDWARD E. OSBORN,
JNO. L. TAGGARD.

Witnesses as to signature of M. W. Beardsley:
J. RICHARDSON,
E. L. MITCHELL.